(12) United States Patent
Jin et al.

(10) Patent No.: US 12,148,907 B2
(45) Date of Patent: Nov. 19, 2024

(54) BATTERY PACK

(71) Applicant: CONTEMPORARY AMPEREX TECHNOLOGY (HONG KONG) LIMITED, Hong Kong (CN)

(72) Inventors: Haizu Jin, Ningde (CN); Kaijie You, Ningde (CN); Yuepan Hou, Ningde (CN); Fei Hu, Ningde (CN); Peng Wang, Ningde (CN); Zhenhua Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 658 days.

(21) Appl. No.: 17/418,762

(22) PCT Filed: Mar. 26, 2019

(86) PCT No.: PCT/CN2019/079640
§ 371 (c)(1),
(2) Date: Jun. 25, 2021

(87) PCT Pub. No.: WO2020/140336
PCT Pub. Date: Jul. 9, 2020

(65) Prior Publication Data
US 2022/0077521 A1  Mar. 10, 2022

(30) Foreign Application Priority Data

Dec. 30, 2018 (CN) .......................... 201822275458.4

(51) Int. Cl.
*H01M 10/6554* (2014.01)
*H01M 10/04* (2006.01)
(Continued)

(52) U.S. Cl.
CPC ... *H01M 10/6554* (2015.04); *H01M 10/0431* (2013.01); *H01M 10/613* (2015.04);
(Continued)

(58) Field of Classification Search
CPC ......... H01M 10/0431; H01M 10/0587; H01M 10/613; H01M 10/653; H01M 10/6554; H01M 50/209; H01M 50/289
See application file for complete search history.

(56) References Cited

U.S. PATENT DOCUMENTS

| 10,256,451 B2 * | 4/2019 | Kim .................... H01M 50/509 |
| 2016/0365552 A1 * | 12/2016 | Kato ........................ B60L 50/64 |
| 2018/0034117 A1 | 2/2018 | Bang et al. |

FOREIGN PATENT DOCUMENTS

| CN | 206301913 | * | 7/2017 |
| CN | 206992272 | * | 2/2018 |

(Continued)

OTHER PUBLICATIONS

English translation of CN Publication 206992272, Feb. 2018.*
(Continued)

*Primary Examiner* — Brittany L Raymond
(74) *Attorney, Agent, or Firm* — Kilpatrick Townsend & Stockton LLP (57) ABSTRACT

The present disclosure provides a battery pack, including: a battery box, a plurality of battery modules, a cooling plate, and a buffering member. Each battery module includes a plurality of battery cells and a plurality of busbars. Each battery cell includes an electrode assembly and a battery housing. The battery cells are laid flat. When the electrode assembly is of a wound structure and is flat, and outer surfaces of the electrode assembly include two flat surfaces. The two flat surfaces are opposite to each other in a vertical direction. Alternatively, when the electrode assembly is of a laminated structure, a first electrode plate, a separator, and a second electrode plate are stacked in a vertical direction. Therefore, the electrode assembly of the battery cells applies a greatest expansion force in the vertical direction during charge and discharge.

8 Claims, 9 Drawing Sheets

(51) Int. Cl.
  *H01M 10/613* (2014.01)
  *H01M 10/653* (2014.01)
  *H01M 50/209* (2021.01)
  *H01M 50/24* (2021.01)
  *H01M 50/249* (2021.01)
  *H01M 50/289* (2021.01)

(52) U.S. Cl.
  CPC ....... *H01M 10/653* (2015.04); *H01M 50/209* (2021.01); *H01M 50/24* (2021.01); *H01M 50/249* (2021.01); *H01M 50/289* (2021.01)

(56) References Cited

FOREIGN PATENT DOCUMENTS

| CN | 207651625 | * | 7/2018 |
| CN | 207651625 | U | 7/2018 |
| JP | 2013229266 | A | 11/2013 |

OTHER PUBLICATIONS

English translation of CN Publication 206301913, Jul. 2017.*
English translation of CN Publication 207651625, Jul. 2018.*
Contemporary Amperex Technology Co., Limited, PCT International Search Report and English Translation, PCT/CN2019/079640, Sep. 16, 2019, 5 pgs.
Contemporary Amperex Technology Co., Limited, PCT ISA Written Opinion, PCT/CN2019/079640, Sep. 16, 2019, 3 pgs.
Contemporary Amperex Technology Co., Limited, Extended European Search Report, EP 19906933.7, Dec. 20, 2021, 6 pgs.
Notification to Grant Patent Right received in the corresponding Chinese Application 201822275458.4, mailed Jul. 18, 2019.
Communication about intention to grant a European patent received in the corresponding European Application 19906933.7, mailed Aug. 19, 2022.
First Office Action received in the corresponding European Application 19906933.7, mailed Apr. 7, 2022.

* cited by examiner

BATTERY PACK

CROSS REFERENCE TO RELATED APPLICATIONS

The present application is a United States National Stage Application filed under 35 U.S.C. § 371 of PCT Patent Application No. PCT/CN2019/079640, entitled "BATTERY PACK," filed Mar. 26, 2019, which claims priority to Chinese Patent Application No. 201822275458.4, filed on Dec. 30, 2018, entitled "BATTERY PACK," each of which is incorporated herein by reference in its entirety.

TECHNICAL FIELD

The present disclosure relates to the technical field of batteries, and in particular, to a battery pack.

BACKGROUND

A battery pack includes a plurality of battery modules, each of which includes an array of battery cells. The battery cells generate heat during charge and discharge. Therefore, a cooling system (such as a cooling plate) needs to be mounted for the battery pack. However, due to manufacturing problems, a surface of the cooling plate and a surface of a battery box are not exactly flat. Therefore, a contact area between the cooling plate and the battery box is relatively small, thereby decreasing a heat dissipation area and reducing heat dissipation effects of the cooling plate.

SUMMARY

In view of the foregoing situation, a battery pack needs to be provided to solve the problem of inferior cooling effects of a cooling plate in existing technologies.

To achieve the foregoing objective, a battery pack is provided, including: a battery box, where the battery box includes an upper cover and a lower box, and the upper cover and the lower box are sealed; a plurality of battery modules, accommodated in the battery box, where each battery module includes a plurality of battery cells arranged in a horizontal direction and a plurality of busbars electrically connecting the plurality of battery cells, each battery cell includes an electrode assembly and a battery housing, the electrode assembly is accommodated in the battery housing, and the electrode assembly includes a first electrode plate, a second electrode plate, and a separator disposed between the first electrode plate and the second electrode plate; a cooling plate, disposed at a side of the battery module in a vertical direction; and a buffering member, disposed between the cooling plate and the battery box, where an elastic modulus of the buffering member is less than an elastic modulus of the cooling plate and an elastic modulus of the battery box. The electrode assembly is of a wound structure and is flat, outer surfaces of the electrode assembly include two flat surfaces that are opposite to each other in the vertical direction; or, the electrode assembly is of a laminated structure, and the first electrode plate, the separator, and the second electrode plate are stacked along the vertical direction.

For example, two surfaces of the buffering member are in contact with the battery box and the cooling plate respectively, and the cooling plate is fixed to the battery box through the buffering member.

For example, the buffering member is a thermally conductive structural adhesive, and two surfaces of the thermally conductive structural adhesive are adhered to the battery box and the cooling plate respectively; or the buffering member is a thermal pad, and the thermal pad is fixed between the cooling plate and the battery box.

For example, a size of the battery module in the horizontal direction is larger than that in the vertical direction.

For example, the cooling plate is disposed outside the battery box.

For example, the battery pack includes two cooling plates. The two cooling plates are disposed above the battery box and below the battery box respectively.

For example, the cooling plate is disposed inside the battery box. In addition, a thermally conductive structural adhesive is disposed between a bottom of the battery module and an inner bottom of the battery box; and/or, a thermally conductive structural adhesive is disposed between a top of the battery module and an inner top of the battery box.

For example, a fluid passage is defined inside the cooling plate, the fluid passage extends in the horizontal direction, and an inlet and an outlet of the fluid passage are arranged at a same end of the cooling plate in the horizontal direction.

For example, the battery cell includes a plurality of the electrode assemblies, and the plurality of the electrode assemblies are stacked in the vertical direction.

For example, the elastic modulus of the buffering member is in a range from 2 GPa to 5 GPa, the elastic modulus of the cooling plate is in a range from 50 GPa to 150 GPa, and the elastic modulus of the battery box is in a range from 50 GPa to 150 GPa.

In contrast to existing technologies, the battery cells lie flat in the technical solution described above. To be specific, when the electrode assembly is of a wound structure and is flat, and outer surfaces of the electrode assembly include two flat surfaces. The two flat surfaces are opposite to each other in the vertical direction. When the electrode assembly is of a laminated structure, the first electrode plate, the separator, and the second electrode plate are stacked in the vertical direction. Therefore, the electrode assembly of the battery cells applies a greatest expansion force in the vertical direction during charge and discharge. The cooling plate is disposed at a side of the battery module in the vertical direction (that is, a direction of the greatest expansion force). In addition, the buffering member is disposed between the cooling plate and the battery box (the elastic modulus of the buffering member is less than the elastic modulus of the cooling plate and the elastic modulus of the battery box, that is, the buffering member is softer). Therefore, the greatest expansion force applied by the battery cells on the buffering member enables the buffering member to fit closely with both the cooling plate and the battery box concurrently, thereby increasing a heat dissipation area to improve heat dissipation effects of the cooling plate.

REFERENCE NUMERALS

1. Battery box;
11. Upper cover; 12. Lower box;
2. Battery module;
21. Battery cell; 22. Busbar;
211. Electrode assembly; 212. Battery housing; 213. Electrode terminal connecting piece; 214. Cover plate;
21a. Wound electrode assembly; 21b. Laminated electrode assembly;
2110. Flat surfaces; 2111. First electrode plate; 2112. Second electrode plate;
2113. Separator; 2121. First surface; 2122. Second surface;
3. Cooling plate;
31. Circulative fluid duct; and
4. Buffering member

DETAILED DESCRIPTION OF EMBODIMENTS

To describe the technical content, structural features, objectives, and effects of the technical solution in detail, the following describes the technical solution in detail with reference to specific embodiments and drawings.

In the context of the present disclosure, unless otherwise expressly specified and defined, the terms "first," "second," and "third" are for the sole purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in the present disclosure according to the context.

In all accompanying drawings used for description of the present disclosure, the direction indicated by the arrow X is a length direction, the direction indicated by the arrow Y is a width direction, and the direction indicated by the arrow Z is a vertical direction. The horizontal direction is a direction parallel to a horizontal plane, and may be the length direction or the width direction. In addition, the horizontal direction includes not only a direction absolutely parallel to the horizontal plane, but also a direction substantially parallel to the horizontal plane in a general sense of engineering. The vertical direction is a direction perpendicular to the horizontal plane. The vertical direction includes not only a direction absolutely perpendicular to the horizontal plane, but also a direction substantially perpendicular to the horizontal plane in a general sense of engineering. In addition, directional terms such as "upper," "lower," "top," and "bottom" described in the present disclosure are all understood with respect to the vertical direction. For ease of understanding and description, directions will be described below according to an X-Y-Z coordinate system in the drawings.

Figure 1:
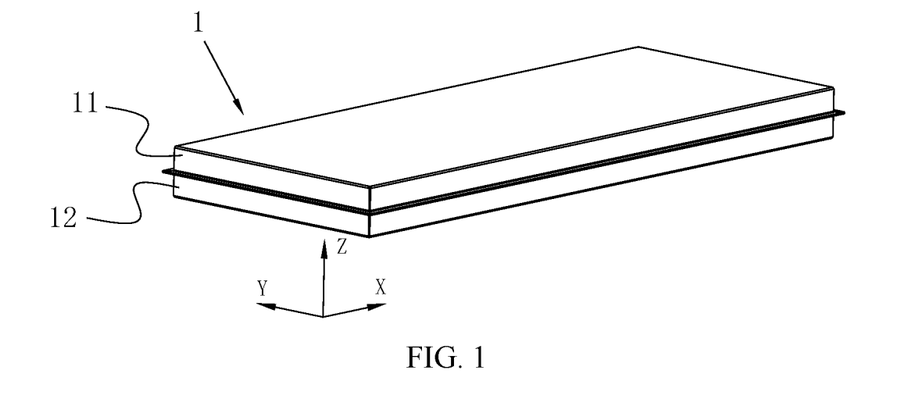
FIG. 1 is a schematic diagram of a battery box of a battery pack according to an embodiment.

As shown in FIG. 1 to FIG. 6, an embodiment of the present disclosure provides a battery pack, including: a battery box 1, a plurality of battery modules 2, a cooling plate 3, and a buffering member 4. The battery box 1 includes an upper cover 11 and a lower box 12 (as shown in FIG. 1). The upper cover 11 is disposed on the lower box 12, and the upper cover 11 and the lower box 12 are sealed. The sealing of the upper cover 11 and the lower box 12 can prevent external moisture from entering the battery pack to cause a short circuit. The battery pack is suitable for being directly mounted in a vehicle to server as a power source for the vehicle.

The plurality of battery modules 2 are disposed in the battery box 1. The buffering member 4 is disposed between the cooling plate 3 and the battery box 1. An elastic modulus of the buffering member 4 is less than an elastic modulus of the cooling plate 3 and an elastic modulus of the battery box 1, that is, the buffering member 4 is softer. Therefore, a maximum expansion force exerted by the battery cells on the buffering member 4 may be used to make the buffering member 4 adhere tightly to both the cooling plate 3 and the battery box 1 concurrently, thereby increasing a heat dissipation area to improve heat dissipation effects of the cooling plate 3.

Figure 2:
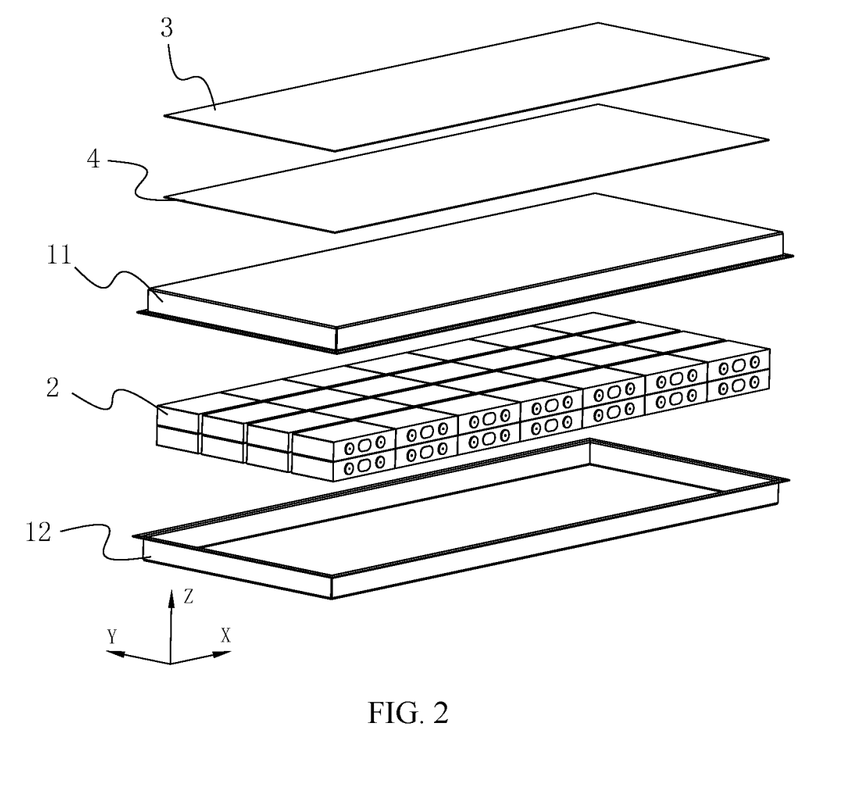
FIG. 2 is an exploded view of a battery pack according to an embodiment, in which a cooling plate is disposed above a battery box.
Figure 3:
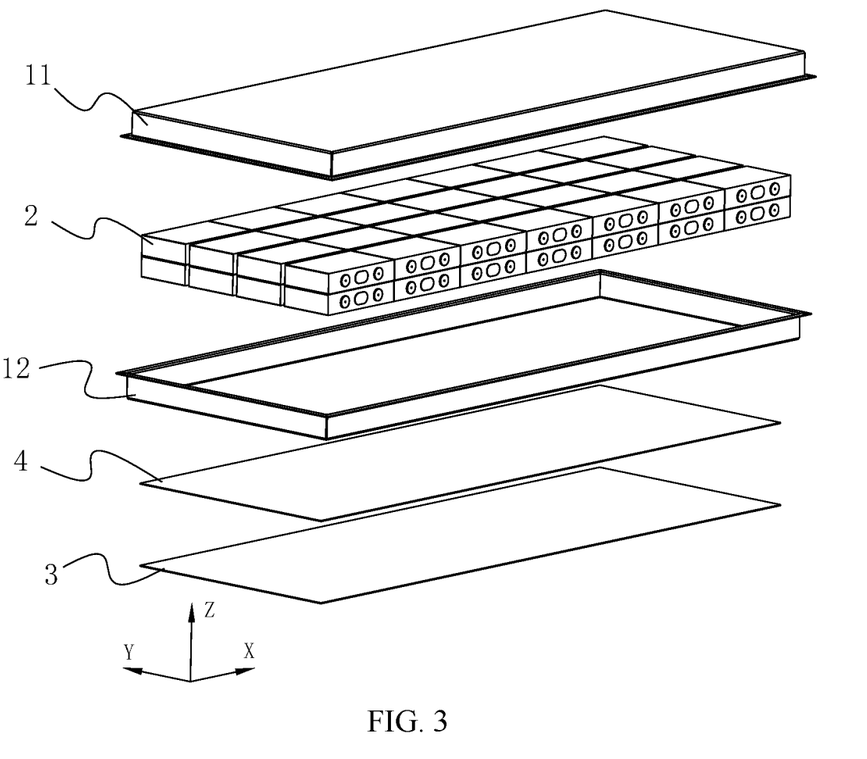
FIG. 3 is an exploded view of a battery pack according to an embodiment, in which a cooling plate is disposed below a battery box.

As shown in FIG. 2 and FIG. 3, the cooling plate 3 is mounted outside the battery box 1. For example, a plate face of the cooling plate 3 is parallel to a horizontal plane (a plane in which the X-axis and the Y-axis are located). The cooling plate 3 is fitted snugly on the battery box 1, so that the cooling plate 3 is mounted on an outer surface of the battery box 1, the outer surface is parallel to the plane in which the X-axis and the Y-axis are located. In addition, the horizontal outer surfaces of the battery box 1 (parallel to the plane in which the X-axis and the Y-axis are located) are parallel to a first surface 2121 of each battery cell of the battery module, thereby increasing the heat dissipation area of the battery pack in contact with the cooling plate 3 and improving the cooling and heat dissipation effects of the battery pack.

Figure 4:
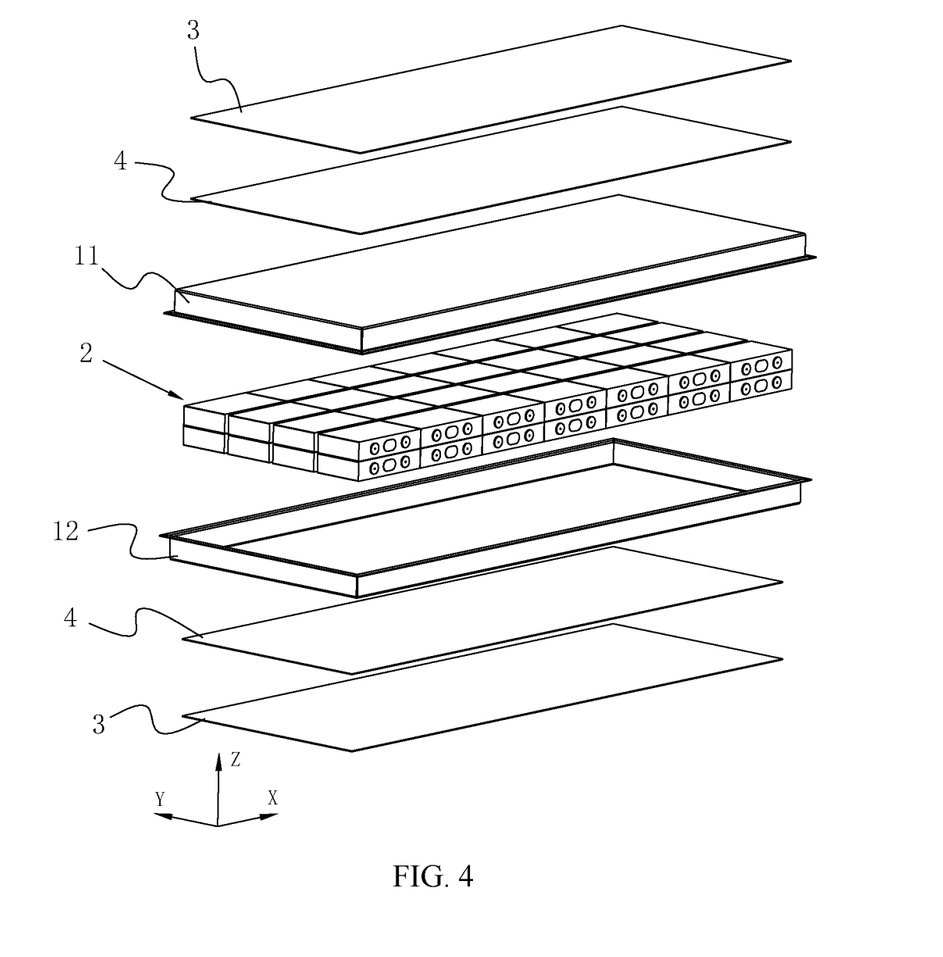
FIG. 4 is an exploded view of a battery pack according to an embodiment, in which a cooling plate is disposed each above and below a battery box.

In addition, as shown in FIG. 4, in this embodiment, a cooling plate 3 may be mounted each above and below the battery box 1, that is, mounted on each of the horizontal outer surfaces of the battery box 1 (parallel to the plane in which the X-axis and the Y-axis are located). In this way, both upper and lower sides of the battery box 1 are cooled and heat-dissipated, and the cooling efficiency is improved.

In this embodiment, two surfaces of the buffering member 4 are in contact with the battery box 1 and cooling plate 3, respectively, and the cooling plate 3 is fixed to the battery box 1 through buffering member 4. For example, one surface of the buffering member 4 is fixed onto the battery box 1, and the other surface of the buffering member 4 is fixed onto the cooling plate 3. The fixing may be implemented by bonding, bolting, riveting, and the like. This increases the heat dissipation area between the buffering member 4 and the battery box 1, and between the buffering member 4 and the cooling plate 3.

In this embodiment, the buffering member 4 may be a thermally conductive structural adhesive, which is tightly adhered between the cooling plate 3 and the battery box 1 through its inherent adhesiveness, fills a gap between the battery box 1 and the cooling plate 3, and increases a contact area between the battery box 1 and the cooling plate 3. In addition, the thermally conductive structural adhesive is of high thermal conductivity, and implements excellent cooling and heat dissipation for the battery box 1. The buffering member 4 may be a thermal pad, which is mounted by fixing, that is, fixed between the cooling plate 3 and the battery box 1 by bonding, bolting, riveting, and the like, so that the cooling plate 3 is fitted firmly on the battery box 1. As being made from a thermal conductive material with high-performance and for gap-filling, the thermal pad is mainly used as a transfer interface between an electronic device and a heat sink or a product housing. The thermal pad is of high viscosity, flexibility, excellent compression performance, and high thermal conductivity. Therefore, air between an electronic element and the heat sink may be sufficiently exhausted by using the thermal pad, resulting in sufficient contact therebetween and thus significantly increased heat dissipation effects.

Specifically, the elastic modulus of the buffering member 4 is in a range from 2 GPa to 5 GPa, the elastic modulus of the cooling plate 3 is in a range from 50 GPa to 150 GPa, and the elastic modulus of the battery box 1 is in a range from 50 GPa to 150 GPa. Understandably, the elastic modulus of the buffering member 4 is much less than the elastic modulus of the cooling plate 3 and the battery box 1. That is, the buffering member 4 is softer than the cooling plate 3 and the battery box 1. Therefore, when the cooling plate 3 is fixed onto the battery box 1 through the buffering member 4, the gap between the cooling plate 3 and the battery box 1 is filled with the buffering member 4 due to its softness, thereby increasing the heat dissipation area and improving the effect and efficiency of cooling.

Figure 5:
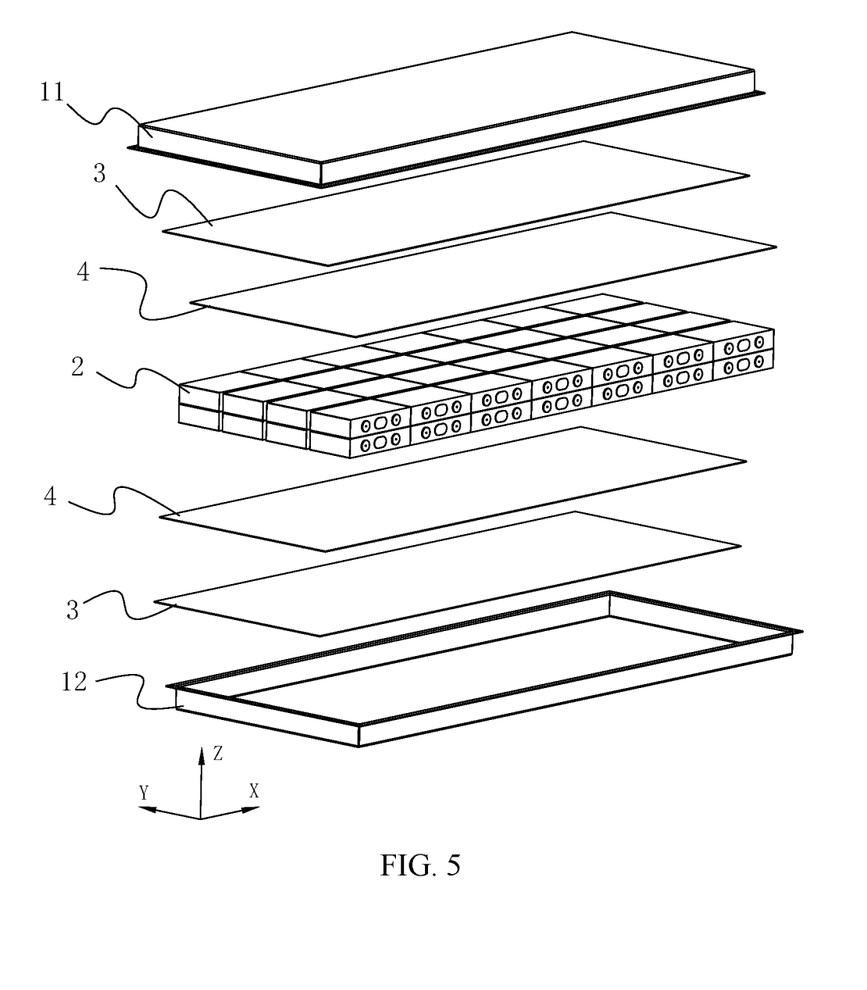
FIG. 5 is an exploded view of a battery pack according to an embodiment, in which a cooling plate is disposed inside a battery box.

As shown in FIG. 5, the cooling plate 3 may be placed inside the battery box 1, and surfaces of the cooling plate 3 are also parallel to the horizontal plane (i.e., the plane in which the X-axis and the Y-axis are located). One surface of the cooling plate 3 fits snugly with a horizontal plane which the first surfaces 2121 of a plurality of battery cells are located on and coplanar with each other, where the plurality of battery cells are disposed in a top layer and/or a bottom layer of a plurality of battery modules 2, so as to ensure a largest contact surface between the battery cells and the cooling plate 3 that fit snugly together. In addition, to prevent a gap between the battery module and the cooling plate 3, the cooling plate 3 is closely affixed onto the plurality of battery modules 2 by a thermally conductive structural adhesive. This improves the cooling and heat dissipation area and the cooling efficiency of the battery modules.

Figure 6:
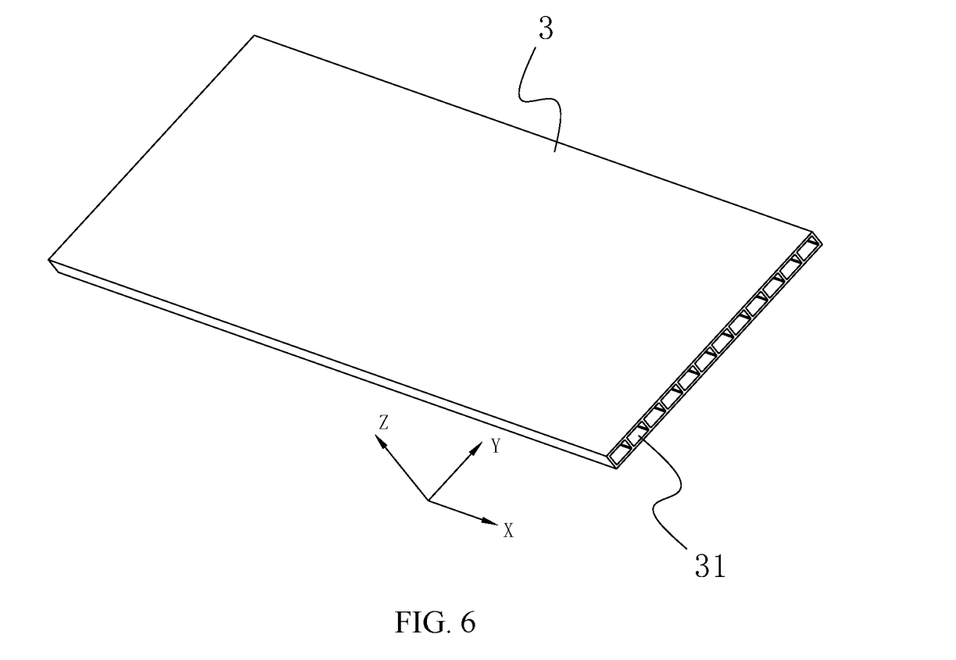
FIG. 6 is a schematic diagram of a cooling plate of a battery pack according to an embodiment.

As shown in FIG. 6, a fluid passage 31 is defined inside the cooling plate 3. The fluid passage 31 extends in a horizontal direction (the X-axis direction) inside the cooling plate 3. The cooling plate 3 may be made of a metal material, and specifically, aluminum, aluminum alloy, magnesium-aluminum alloy, steel, and the like. For example, a center axis of the fluid passage 31 is parallel to a lateral surface of the cooling plate 3, the lateral surface being parallel to a vertical plane (i.e., the plane in which the Z-axis and the X-axis are located). An inlet and an outlet of the fluid passage 31 are arranged on a same lateral surface of the cooling plate 3 (that is, may be disposed on one of two lateral surfaces of the cooling plate 3, the two lateral surfaces being parallel to a plane in which the Y-axis and the Z-axis are located). In this way, the fluid passage 31 allows a reciprocal flow within the cooling plate 3. Therefore, a cooling medium inputted from the inlet is evenly distributed within the cooling plate 3, and a temperature difference of the cooling medium between two ends of the cooling plate 3 is relatively small, thereby improving the cooling effect of the cooling plate 3.

Figure 7:
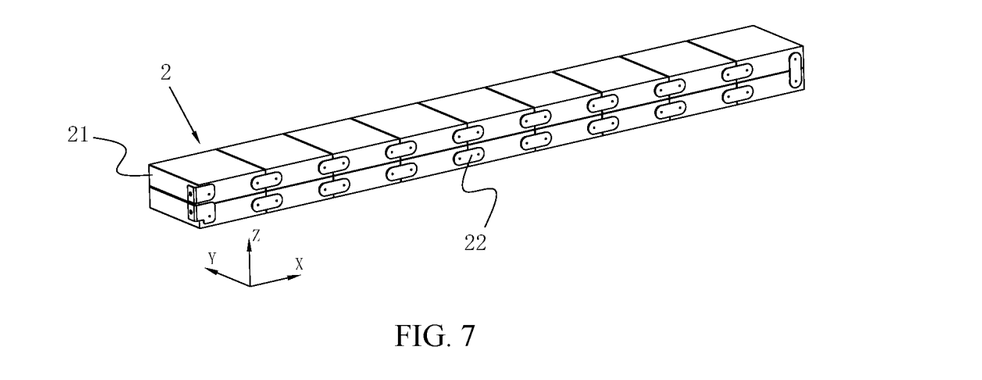
FIG. 7 is a schematic diagram of battery modules of a battery pack according to an embodiment.

As shown in FIG. 7, the plurality of battery modules 2 include a plurality of battery cells 21 arranged in the horizontal direction (for example, a length direction indicated by an arrow x) and a plurality of busbars 22 electrically connects the plurality of battery cells 21.

Figure 8:
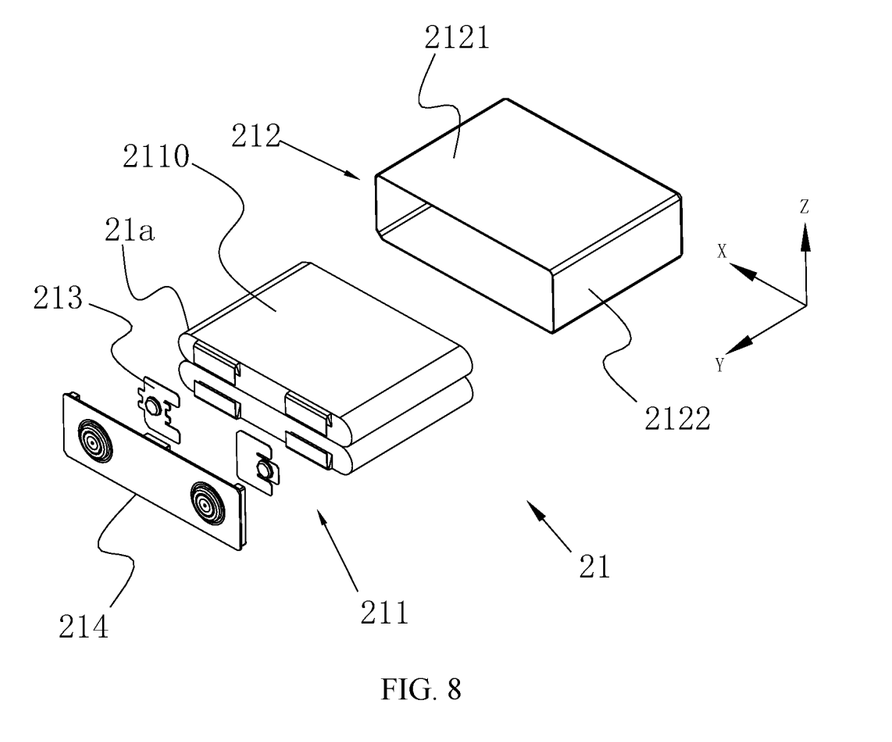
FIG. 8 is an exploded view of a battery cell of a battery pack according to an embodiment.

As shown in FIG. 8, a battery cell 21 includes an electrode assembly 211, a battery housing 212, an electrode terminal connecting piece 213, and a cover plate 214. The battery housing 212 may be in a hexahedral shape or other shapes. The battery housing 212 includes an internal space for accommodating the electrode assembly 211 and an electrolytic solution, and the battery housing 212 includes an opening. The electrode assembly 211 is accommodated in the battery housing 212. The cover plate 214 covers the opening and serves to close off the battery housing 212 containing the electrode assembly 211. The electrode assembly 211 is electrically connected to an electrode terminal by the electrode terminal connecting piece 213. In this embodiment, there are two electrode terminal connecting pieces 213: a positive connecting piece and a negative connecting piece. The battery housing 212 may be made of a material such as aluminum, aluminum alloy, or plastic.

The electrode assembly 211 is accommodated in the battery housing 212. The electrode assembly 211 includes a first electrode plate 2111, a second electrode plate 2112, and a separator 2113 disposed between the first electrode plate 2111 and the second electrode plate 2112. The first electrode plate 2111 may be a positive electrode plate or a negative electrode plate. The second electrode plate 2112 is opposite to the first electrode plate 2111 in polarity. Correspondingly, the second electrode plate 2112 is a negative electrode plate or a positive electrode plate. The separator 2113 is an insulator between the first electrode plate 2111 and the second electrode plate 2112. The electrode assembly 211 may be of a wound structure (as shown in FIG. 9) or a laminated structure (as shown in FIG. 10).

An example is described here in which the first electrode plate 2111 is a positive electrode plate and the second electrode plate 2112 is a negative electrode plate. Likewise, in other embodiments, the first electrode plate 2111 may be a negative electrode plate, and the second electrode plate 2112 may be a positive electrode plate. In addition, a positive active substance is coated onto a coated region of the positive electrode plate, and a negative active substance is coated onto a coated region of the negative electrode plate. An uncoated region extending from the coated region serves as a tab. The electrode assembly 211 includes two tabs: a positive tab and a negative tab. The positive tab extends from the coated region of the positive electrode plate, and the negative tab extends from the coated region of the negative electrode plate. The positive tab is electrically connected to a positive electrode terminal through a positive connecting piece, and the negative tab is electrically connected to a negative electrode terminal through a negative connecting piece.

As shown in FIG. 8, the battery housing 212 is of a substantially hexahedral structure. The battery housing 212 includes two first surfaces 2121 and two second surfaces 2122. The first surface 2121 is larger than the second surface 2122 in area. In an arrangement structure of the battery cells 21, two second surfaces 2122 of each battery cell 21 are opposite to each other in the horizontal direction (for example, the direction indicated by the X-axis). Two first surfaces 2121 of each battery cell 21 are opposite to each other in the vertical direction (the direction indicated by the Z-axis).

Figure 9:
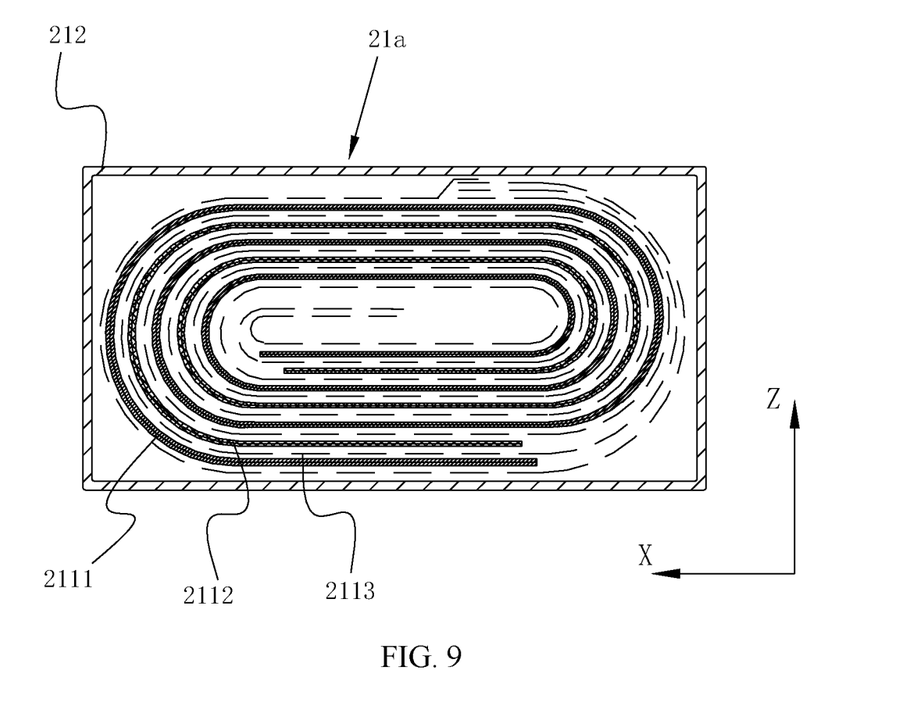
FIG. 9 is a cross-sectional view of a wound battery cell of a battery pack according to an embodiment.
Figure 10:
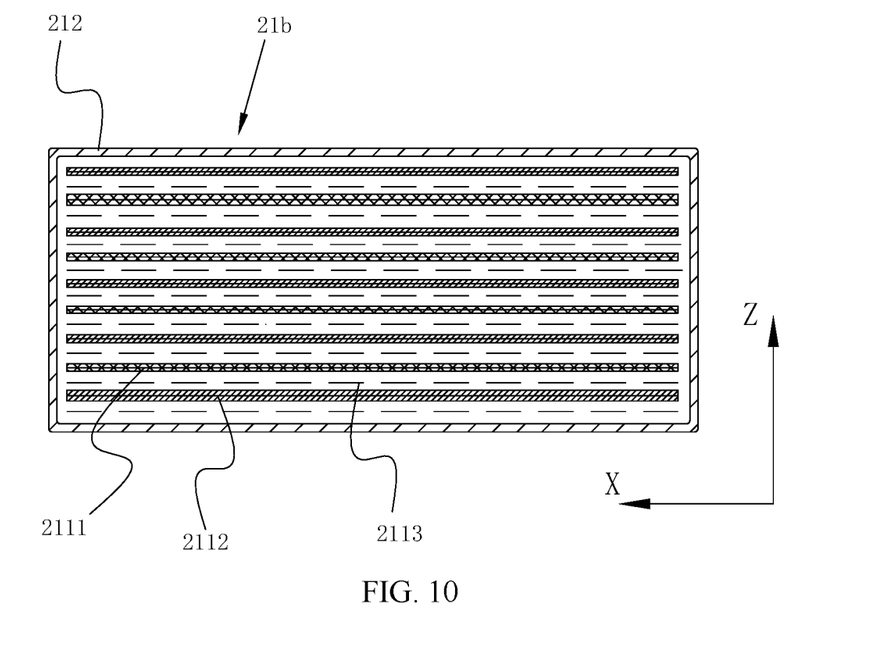
FIG. 10 is a cross-sectional view of a laminated battery cell of a battery pack according to an embodiment.

As shown in FIG. 9, when the electrode assembly 211 is of a wound structure, the electrode assembly 211 is flat, and an outer surface of the electrode assembly 211 includes two flat surfaces 2110 (as shown in FIG. 8) that are opposite to each other in the vertical direction. That is, the flat surfaces 2110 are opposite to the first surface 2121. The electrode assembly 211 is of a substantially hexahedral structure. The flat surfaces 2110 are substantially parallel to a winding axis and are largest in area among outer surfaces. The flat surfaces 2110 may be relatively flat, but not necessarily exactly planar.

As shown in FIG. 10, when the electrode assembly 211 is of a laminated structure, the first electrode plate 2111, the separator 2113, and the second electrode plate 2112 are stacked in the vertical direction. That is, the surface of the first electrode plate 2111 and the first surface 2121 are opposite to each other.

The electrode assembly 211 may inevitably expand in a thickness direction of the first electrode plate 2111 during charge and discharge (in the electrode assembly 211 of the wound structure, an expansion force is greatest in a direction perpendicular to the flat surfaces 2110; and, in the electrode assembly 211 of the laminated structure, the expansion force is greatest in a stacking direction of the first electrode plate 2111 and the second electrode plate 2112).

In this embodiment, the flat surfaces 2110 of the wound electrode assembly 211 are oriented to the vertical direction (the direction indicated by the Z-axis). Alternatively, the first electrode plate 2111 and the second electrode plate 2112 of the laminated electrode assembly 211 are stacked along the vertical direction (the direction indicated by the Z-axis). Evidently, no matter whether the electrode assembly 211 is of a wound structure or a laminated structure, the electrode assembly applies the greatest expansion force on the battery housing 212 in the vertical direction.

However, in existing technologies, in the battery cell 21 of the battery module, the electrode assembly applies a greatest expansion force on the battery housing 212 in the horizontal direction. The size of the battery module 2 in the horizontal direction is much larger than the size in the vertical direction (for example, as limited by a height of the vehicle chassis, more battery cells need to be stacked in the horizontal direction, thereby accumulating a relatively large expansion force). Therefore, the battery module in existing technologies bears an extremely large expansion force in the horizontal direction, and it is thus necessary to dispose considerably thick end plates on two sides of the battery module in the horizontal direction to resist the expansion force. The thick end plates reduce an energy density of the battery module. In this embodiment of the present disclosure, the electrode assembly applies the greatest expansion force on the battery housing 212 in the vertical direction, and fewer battery cells are stacked in the vertical direction. Therefore, compared with existing technologies, the greatest expansion force of the battery module is significantly reduced in the present disclosure.

Each battery cell 21 includes a plurality of electrode assemblies 211, and the plurality of electrode assemblies 211 are stacked in the Z-axis direction shown in the drawing. Specifically, as shown in FIG. 9, in a case that the electrode assembly 211 is of a wound electrode assembly 21a, one battery cell includes, for example, two electrode assemblies 211. The flat surfaces 2110 of the two electrode assemblies 211 are stacked along the Z-axis. The first electrode plate 2111 and the second electrode plate 2112 of each of the two electrode assemblies are connected and fitted with each other. Then the two stacked electrode assemblies are placed into the battery housing 212, so that the flat surfaces 2110 are stacked in the Z-axis direction. Likewise, as shown in FIG. 10, the electrode assemblies 211, each of which is of a laminated electrode assembly 21b, are also stacked in the Z-axis direction. A height of the stack is flexibly determined according to a height of the opening of the battery housing 212 (for example, the height of the battery housing in the Z-axis direction in the drawing). The electrode assemblies 211 apply the greatest expansion force on the battery housing 212 in the Z-axis direction.

In this embodiment, the size of the battery module in the horizontal direction (for example, the X-axis direction) is larger than that in the vertical direction (for example, the Z-axis direction). This reduces a quantity of the battery cells stacked in the vertical direction (for example, the Z-axis direction), and reduces the expansion force of the batteries in the vertical direction. The battery cells 21 are arranged in the horizontal direction (for example, the X-axis direction) in such a manner that a second surface 2122 of one battery cell is adjacent to a second surface 2122 of another battery cell, so that the expansion force of the battery module in the horizontal direction is relatively small. In addition, the disposition manner of the two electrode assemblies 211 in the battery cell 21 described above also greatly reduces the expansion force of the battery cell 21 on the second surfaces 2122. Therefore, the impact caused by the expansion force to the battery module is substantially neglectable, and an energy density of the battery pack is increased.

In addition, after the battery cells 21 in the battery box 1 are put into use, the battery cells expand. Therefore, the battery box 1 is deformed to some extent (inside-out expansion and deformation) to compress the buffering member 4. In this way, the cooling plate 3 fits the battery box 1 more closely but without damaging the buffering member 4 due to flexibility of the buffering member, thereby improving the effects of cooling and heat dissipation.

It should be noted that although the foregoing embodiments have been described herein, the protection scope of the present disclosure is not limited to the embodiments. Therefore, any changes and modifications made to the embodiments hereof based on the innovative concept of the present disclosure, any equivalent structural alterations or equivalent process alterations made by using the content of the specification and drawings of the present disclosure, and any direct or indirect application of the foregoing technical solutions to any other related technical fields, fall within the protection scope of the present disclosure.

What is claimed is:

1. A battery pack, comprising:
  a battery box, wherein the battery box comprises an upper cover and a lower box arranged in a vertical direction, and the upper cover and the lower box are sealed;
  a plurality of battery modules, accommodated in the battery box, wherein each battery module comprises a plurality of battery cells arranged in a horizontal direction and a plurality of busbars electrically connecting the plurality of battery cells, each battery cell comprises an electrode assembly and a battery housing, the electrode assembly is accommodated in the battery housing, and the electrode assembly comprises a first electrode plate, a second electrode plate, and a separator disposed between the first electrode plate and the second electrode plate, the battery housing comprises a cover plate, two first surfaces, and two second surfaces, the cover plate extends in the vertical direction, the two first surfaces extend in the horizontal direction and are opposite to each other in the vertical direction, the two second surfaces extend in the vertical direction and are opposite to each other in the horizontal direction, the two first surfaces are larger than the two second surfaces in area;

a cooling plate, disposed at an outer surface of the battery box and extending in the horizontal direction; and a buffering member, disposed outside the battery box and between the cooling plate and an outer surface of the battery box and extending in the horizontal direction, wherein an elastic modulus of the buffering member is less than each of an elastic modulus of the cooling plate and an elastic modulus of the battery box;

wherein, the electrode assembly is of a wound structure and is flat; or the electrode assembly is of a laminated structure, and the first electrode plate, the separator, and the second electrode plate are stacked along the vertical direction, and outer surfaces of the electrode assembly comprises two flat surfaces that are substantially parallel to the two first surfaces of the battery housing and opposite to each other in the vertical direction.

2. The battery pack according to claim 1, wherein two surfaces of the buffering member are in contact with the battery box and the cooling plate respectively, and the cooling plate is fixed to the battery box through the buffering member.

3. The battery pack according to claim 2, wherein the buffering member is a thermally conductive structural adhesive, and two surfaces of the thermally conductive structural adhesive are adhered to the battery box and the cooling plate respectively; or the buffering member is a thermal pad, and the thermal pad is fixed between the cooling plate and the battery box.

4. The battery pack according to claim 1, wherein a size of the battery module in the horizontal direction is larger than that in the vertical direction.

5. The battery pack according to claim 1, wherein the battery pack comprises two cooling plates, and the two cooling plates are disposed above the battery box and below the battery box respectively.

6. The battery pack according to claim 1, wherein a fluid passage is defined inside the cooling plate, the fluid passage extends in the horizontal direction, and an inlet and an outlet of the fluid passage are arranged at a same end of the cooling plate in the horizontal direction.

7. The battery pack according to claim 1, wherein each of the battery cells comprises a plurality of electrode assemblies, and the plurality of the electrode assemblies are stacked in the vertical direction.

8. The battery pack according to claim 1, wherein the elastic modulus of the buffering member is in a range from 2 GPa to 5 GPa, the elastic modulus of the cooling plate is in a range from 50 GPa to 150 GPa, and the elastic modulus of the battery box is in a range from 50 GPa to 150 GPa.

* * * * *